United States Patent
Lin et al.

(10) Patent No.: US 10,462,747 B2
(45) Date of Patent: *Oct. 29, 2019

(54) RADIO-FREQUENCY MODULE AND WIRELESS DEVICE

(71) Applicant: Realtek Semiconductor Corp., HsinChu (TW)

(72) Inventors: Hou-Wei Lin, Hsinchu (TW); Yi-Cheng Chen, Hsinchu (TW); Chia-Chun Hung, Hsinchu (TW); Yi-Chang Shih, Hsinchu (TW); Liang-Hui Li, Hsinchu County (TW); Yi-Lin Li, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 60 days.

This patent is subject to a terminal disclaimer.

(21) Appl. No.: 16/028,408

(22) Filed: Jul. 5, 2018

(65) Prior Publication Data

US 2018/0317177 A1 Nov. 1, 2018

Related U.S. Application Data

(63) Continuation of application No. 15/611,798, filed on Jun. 2, 2017, now Pat. No. 10,064,140.

(Continued)

(51) Int. Cl.
*H04M 1/00* (2006.01)
*H04W 52/02* (2009.01)
(Continued)

(52) U.S. Cl.
CPC ... *H04W 52/0261* (2013.01); *H04W 52/0274* (2013.01); *H04L 27/18* (2013.01); *H04W 4/80* (2018.02)

(58) Field of Classification Search
CPC . H04W 52/0261; H04W 52/00; H04W 52/02; H04W 88/06
(Continued)

(56) References Cited

U.S. PATENT DOCUMENTS

| 8,068,547 B2 | 11/2011 | Schenk |
| 8,498,589 B2 | 7/2013 | Husted |

(Continued)

FOREIGN PATENT DOCUMENTS

| EP | 3 082 367 | 10/2016 |
| JP | 2004-194036 A | 7/2004 |

(Continued)

*Primary Examiner* — Sonny Trinh
(74) *Attorney, Agent, or Firm* — Winston Hsu

(57) ABSTRACT

A wireless device includes a radio-frequency module, a modem module, and a control unit. The radio-frequency module and the modem module operate either in a first operation mode or in a second operation mode. The control unit, coupled to the RF and the modem module, generates a control signal to indicate to the RF and the modem module to operate in the first operation mode or to operate in the second operation mode. A first set of signal formats corresponding to the first operation mode is a superset of a second set of signal formats corresponding to the second operation mode, and a first power consumption corresponding to the first operation mode is higher than a second power consumption corresponding to the second operation mode.

20 Claims, 3 Drawing Sheets

Related U.S. Application Data

(60) Provisional application No. 62/409,888, filed on Oct. 19, 2016.

(51) Int. Cl.
*H04W 4/80* (2018.01)
*H04L 27/18* (2006.01)

(58) Field of Classification Search
USPC .................. 455/552.1, 574, 127.5, 343.1
See application file for complete search history.

(56) References Cited

U.S. PATENT DOCUMENTS

| | | |
|---|---|---|
| 9,322,932 B2 | 4/2016 | Toyama |
| 2009/0174439 A1 | 7/2009 | Luo |
| 2015/0070097 A1* | 3/2015 | Bauer .................. H03F 1/0227 330/296 |
| 2016/0218674 A1 | 7/2016 | Lin |

FOREIGN PATENT DOCUMENTS

| | | |
|---|---|---|
| JP | 2013-157819 A | 8/2013 |
| JP | 2013-192010 A | 9/2013 |
| WO | 2015/103936 A1 | 7/2015 |

* cited by examiner

RADIO-FREQUENCY MODULE AND WIRELESS DEVICE

CROSS REFERENCE TO RELATED APPLICATIONS

This application is a continuation application of Ser. No. 15/611,798 filed on Jun. 2, 2017, claiming the benefit of U.S. provisional application No. 62/409,888 filed on Oct. 19, 2016, incorporated herein by reference.

BACKGROUND OF THE INVENTION

1. Field of the Invention

The present disclosure relates to a radio-frequency module and a wireless device, and more particularly, to a radio-frequency module and a wireless device capable of reducing power consumption thereof.

2. Description of the Prior Art

Bluetooth is a Personal Area Network (PAN) standard for wireless communications between Bluetooth enabled communication devices. This technology eliminates cables and wires between devices, facilitates both data and voice communication, and enables ad-hoc networks between various Bluetooth devices.

Bluetooth devices are usually powered by batteries, such that Bluetooth devices are required to consume less electricity power. In addition, some Bluetooth devices are expected to provide higher data rate and/or better performance. However, the Bluetooth devices providing higher data rate and/or better performance would consume more power. Therefore, how to maintain data rate and/or performance and to further reduce power consumption is a significant objective in the field.

SUMMARY OF THE INVENTION

It is therefore a primary objective of the present disclosure to provide a radio-frequency module and a wireless device capable of maintaining data rate and/or performance and lowering power consumption.

An embodiment of the present disclosure provides a wireless device, operating within a wireless system, the wireless device comprising a radio-frequency (RF) module and a modem module, configured to operate in a first operation mode or in a second operation mode; and a control unit, coupled to the RF module and the modem module, configured to generate a control signal to indicate the RF module and the modem module to operate in the first operation mode or to operate in the second operation mode; wherein a first set of signal formats corresponding to the first operation mode is a superset of a second set of signal formats corresponding to the second operation mode, and a first power consumption corresponding to the first operation mode is higher than a second power consumption corresponding to the second operation mode; wherein the RF module comprises a first front-end circuit, configured to generate and process the RF signals in the first set of signal formats, comprising a first mixer; a first power amplifier (PA), coupled to the first mixer; a first low noise amplifier (LNA); and a second mixer, coupled to the first LNA, wherein the first mixer and the first PA are configured to generate the RF signals in the first set of signal formats, and the first LNA and the second mixer are configured to receive and process the RF signals in the first set of signal formats; and a second front-end circuit, configured to generate and process the RF signals in the second set of signal formats.

An embodiment of the present disclosure provides a wireless device, operating within a wireless system, the wireless device comprising a radio-frequency (RF) module and a modem module, configured to operate in a first operation mode or in a second operation mode; and a control unit, coupled to the RF module and the modem module, configured to generate a control signal to indicate the RF module and the modem module to operate in the first operation mode or to operate in the second operation mode; wherein a first set of signal formats corresponding to the first operation mode is a superset of a second set of signal formats corresponding to the second operation mode, and a first power consumption corresponding to the first operation mode is higher than a second power consumption corresponding to the second operation mode; wherein the RF module comprises a first mixer; a power amplifier, coupled to the first mixer; a second mixer; a low noise amplifier, coupled to the second mixer; and a synthesizer, coupled to the power amplifier; wherein the first mixer and the power amplifier generate the RF signals in the first set of signal formats when the RF module operates in the first operation mode, and the synthesizer and the power amplifier generate the RF signals in the second set of signal formats when the RF module operates in the second operation mode.

An embodiment of the present disclosure provides radio-frequency (RF) module, comprising a first mixer; a power amplifier, coupled to the first mixer, wherein the first mixer and the power amplifier are configured to generate a first RF signal in a first set of signal formats; a second mixer; a low noise amplifier, coupled to the second mixer, wherein the second mixer and the low noise amplifier are configured to receive a received RF signal in the first set of signal formats; and a synthesizer, coupled to the power amplifier, wherein the synthesizer and the power amplifier are configured to generate a second transmitted RF signal in a second set of signal formats; wherein the first set of signal formats is a superset of the second set of signal formats.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
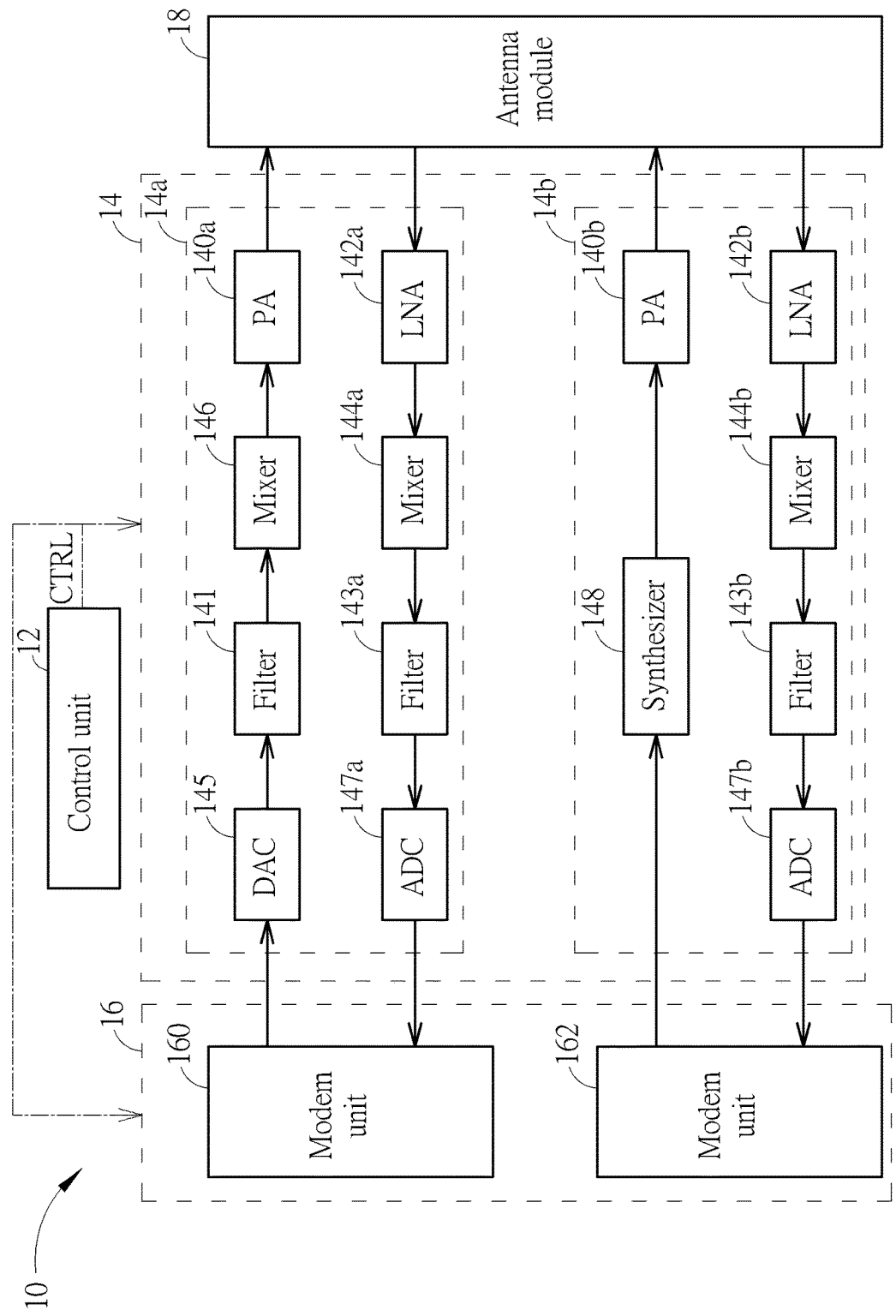
FIG. 1 is a schematic diagram of a wireless device according to an embodiment of the present disclosure.

Reference is made to FIG. 1. FIG. 1 is a schematic diagram of a wireless device 10 according to an embodiment of the present disclosure. The wireless device 10 may be a Bluetooth device, operating within a wireless personal area network (WPAN) system, which may comply with Bluetooth standards/specifications. For devices within a WPAN system, power consumption is an issue for the wireless device, given the fact that the wireless device 10 may utilize a battery for supplying its electricity power. To spare electricity power, the wireless device 10 is able to alternatively operate in a first operation mode, e.g., dual mode (legacy mode and low energy mode), or in a second operation mode, e.g., a low energy (LE) mode. That is, the wireless device 10 transmits or receives RF signals in a first set of signal formats if the wireless device 10 operates in the first operation mode, and the wireless device 10 transmits or receives RF signals in a second set of signal formats if the wireless device 10 operates in the second operation mode, in which the first set of signal formats is a superset of the second set of signal formats. Baseband signals corresponding to the RF signals in the first set of signal formats may include Gaussian frequency shift keying (GFSK) modulated signals and differential phase shift keying (DPSK) modulated signals, e.g., differential quadrature phase-shift keying (π/4 DQPSK) modulated signals or differential 8-phase shift keying (D8PSK) modulated signals. Baseband signals corresponding to the RF signals in the second set of signal formats may be Gaussian frequency shift keying (GFSK) modulated signals. To lower the consumed power, the wireless device 10 is capable of dynamically switching between the first operation mode and the second operation mode, depending on the protocol requirement, how much data needed to be transmitted/received (i.e., the data rate) and/or the performance, e.g. signal quality, circuit linearity, noise, interference tolerance, required by applications.

In detail, as shown in FIG. 1, the wireless device 10 comprises a control unit 12, a radio-frequency (RF) module 14, a modem module 16 and an antenna module 18. The control unit 12, coupled to the RF module 14 and the modem module 16, is configured to determine which operation mode the wireless device 10 should operate in and to generate a control signal CTRL, to indicate the RF module 14 and the modem module 16 either to operate in the first operation mode or in the second operation mode. The RF module 14 and the modem module 16 are configured to generate or process the RF signals in the first set of signal formats, e.g., RF signals corresponding to the π/4 DQPSK, D8PSK or GFSK modulated baseband signals, while operating in the first operation mode, and to generate or process the RF signals in the second set of signal formats, e.g., RF signals corresponding to the GFSK modulated signals, in the second operation mode. The modem module 16, comprising modem units 160 and 162, is configured to generate/process digital data corresponding to the RF signals generated/processed by the RF module 14. The antenna module 18 is configured to transmit the RF signals toward the air or to receive the RF signals from the air.

In some embodiments, the control signal CTRL may be at least one control command.

Specifically, in the current embodiment, the RF module 14 comprises a first front-end circuit 14a and a second front-end circuit 14b, where the first front-end circuit 14a is configured to generate or process the RF signals in the first set of signal formats, and the second front-end circuit 14b is configured to generate or process the RF signals in the second set of signal formats. Notably, in order to save power, if the control unit 12 indicates the RF module 14 and the modem module 16 to operate in the second operation mode, the first front-end circuit 14a is disabled or turned off.

In some embodiments, the control unit 12 determines which mode to operate in according to at least one of a power factor and a performance factor. The power factor may be the power consumed by the wireless device 10 or by the front-end circuits 14a/14b, and the performance factor may be the received signal quality (e.g., SNR), circuit linearity, noise, interference tolerance or the combination thereof.

Furthermore, as shown in FIG. 1, the first front-end circuit 14a comprises a power amplifier (PA) 140a, a low noise amplifier (LNA) 142a, a mixer 144a, a mixer 146, filers 141 and 143a, a digital-to-analog converter (DAC) 145 and an analog-to-digital converter (ADC) 147a. The DAC 145, the filter 141, the mixer 146 and the PA 140a, receiving digital data, e.g., the π/4 DQPSK or D8PSK or GFSK modulated baseband signals, from the modem unit 160, may generate a first transmitted RF signal in the first set of signal formats, such that the antenna module 18 may transmit the first transmitted RF signal in the first set of signal formats toward the air. On the other hand, the antenna module 18 may receive a first received RF signal in the first set of signal formats from the air. The LNA 142a, the mixer 144a, the filter 143a, and the ADC 147a may process the first received RF signal in the first set of signal formats, so as to generate received digital data to the modem unit 160 according to the first received RF signal in the first set of signal formats.

In addition, the second front-end circuit 14b comprises a PA 140b, an LNA 142b, a mixer 144b, a synthesizer 148, a filter 143b and an ADC 147b. Similarly, the synthesizer 148 and the PA 140b, receiving digital data (e.g., the GFSK modulated signals) from the modem unit 162, may generate a second transmitted RF signal in the second set of signal formats, such that the antenna module 18 may transmit the second transmitted RF signal in the second set of signal formats toward the air. The antenna module 18 may receive a second received RF signal in the second set of signal formats from the air. The LNA 142b, the mixer 144b, the filter 143b and the ADC 147b process the second received RF signal in the second set of signal formats, so as to generate received digital data to the modem unit 162 according to the second received RF signal in the second set of signal formats.

Regarding the modem module, in one embodiment, the modem unit 160 is configured to generate/process signals based on DPSK and GFSK modulation, and the modem unit 162 is configured to generate/process digital data based on GFSK modulation.

In another embodiment, the modem unit 160 is configured to generate/process digital data based on DPSK and GFSK modulation, and the modem unit 162 is configured to generate digital data based on GFSK modulation and to process digital data based on DPSK and GFSK modulation.

In some embodiments, the modem units 160 and 162 may be a single modem unit configured to generate/process digital data based on DPSK and GFSK modulation.

Notably, the first front-end circuit 14a, utilized to generate or process the RF signal in the first set of signal formats may achieve better performance in terms of signal quality, circuit linearity, noise sensitivity, interference tolerance, etc., and/or may require more transmission power. In this case, the RF module 14 would consume more power while operating in the first operation mode. To bypass the power consumption disadvantage, if the RF module 14 and the modem module 16 are switched to the second operation mode, the first front-end circuit 14a is disabled or turned off, and the RF module 14 only uses the second front-end circuit 14b to transmit/receive the RF signals in the second set of signal formats, so as to reduce power consumed by the RF module 14.

In addition, the control unit 12 may determine whether to switch to the first operation mode from the second operation mode, or whether to switch to the second operation mode from the first operation mode. In an embodiment, the wireless device 10 may operate in the second operation mode while the wireless device 10 is waiting to be connected. Once the wireless device 10 is connected to another device and there are enhanced data rate (EDR) packets needed to be transmitted, e.g., an upgrade service, a file with large size or voice/audio service that requires to be transmitted in EDR packets, the control unit 12 may indicate the RF module 14 and the modem module 16 to operate in the first operation mode (through the control signal CTRL). After the transmission of EDR packets is completed, the control unit 12 may indicate the RF module 14 and the modem module to switch back to the second operation mode. At this time, the second front-end circuit 14b is activated, and the first front-end circuit 14a may be disabled or turned off, so as to reduce power consumption.

In some embodiments, the wireless device 10 may normally operate in the second operation mode. Once the control unit 12 detects that a data rate of the wireless device is insufficient to maintain the current wireless connection/link, the control unit 12 may indicate the RF module 14 and the modem module 16 to operate in the first operation mode (through the control signal CTRL). After the demand of the data rate is lowered such that the data rate in the second operation mode is sufficient, the control unit 12 may indicate to the RF module 14 and the modem module 16 to switch back to the second operation mode. Again, at this time, the second front-end circuit 14b and modem unit 162 are activated, and the first front-end circuit 14a and the modem unit 160 may be disabled or turned off, so as to reduce power consumption.

In some embodiments, the receiver 14b and modem units 162 may be able to receive a superset of the second set of signal formats, e.g., the first set of signal formats. Therefore, if the control unit 12 detects that it is required to receive signals in the first set of signal formats, e.g., EDR and non-EDR packets, and to transmit signals only in the second set of signal formats, the control unit 12 activates the second operation mode.

In some embodiments, the first operation mode can be used only for transmitting packets, e.g., EDR packets, including signals in the first set of signal formats but not in the second set of signal formats, e.g., DPSK modulated signals, and packets in the second set of signal formats e.g., non-EDR packets, are transmitted in the second operation mode. By this way of per-packet mode switch, the power consumption could be further reduced.

In some embodiments, the mixers 146, 144a and 144b may be coupled to one or more synthesizers (not shown in FIG. 1) for receiving oscillator signals to up-convert baseband signals to radio frequency, or to down-convert RF signals to the baseband. In some embodiments, the mixers 146, 144a and 144b may be coupled to the synthesizer 148 to receive the oscillator signal(s) to up-convert the baseband signals or to down-convert the RF signals.

Figure 2:
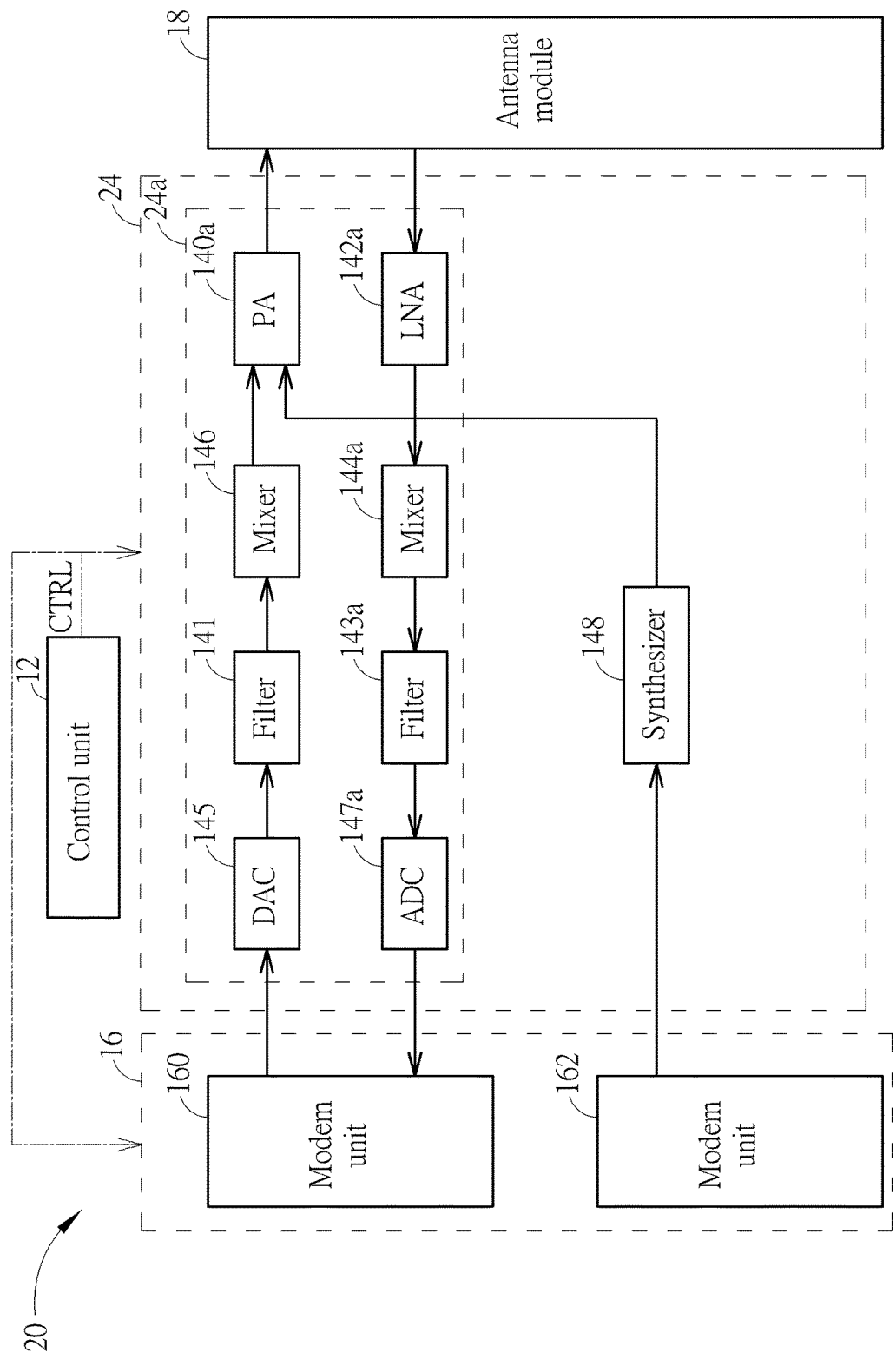
FIG. 2 is a schematic diagram of a wireless device according to an embodiment of the present disclosure.

FIG. 2 is a schematic diagram of a wireless device 20 according to an embodiment of the present disclosure. The wireless device 20 is similar to the wireless device 10, and thus, the same components are denoted by the same notations. Compared to the wireless device 10, the wireless device 20 comprises an RF module 24, and the RF module 24 comprises the first front-end circuit 24a and the synthesizer 148. Within the RF module 24, the synthesizer 148 is coupled to the PA 140a within the first front-end circuit 24a. If the RF module 24 operates in the second operation mode, the synthesizer 148 and the PA 140a generate a transmitted RF signal in the second set of signal formats (e.g., RF signals corresponding to the GFSK signals), according to the digital data from the modem module 16, such that the antenna module 18 transmits the transmitted RF signal in the second set of signal formats toward the air. On the other hand, the LNA 142a, the mixer 144a, the filter 143a and the ADC 147a may process RF signals in the second set of signal formats, and generate the received data in the baseband accordingly. Notably, in the second operation mode, there is no need for the DAC 145, the filter 141 and the mixer 146 to perform operations, and thus, the DAC 145, the filter 141 and the mixer 146 may be disabled or turned off if the RF module 24 operates in the second operation mode or if the synthesizer 148 is activated, so as to reduce power consumption of the wireless device 20.

On the other hand, if the RF module 24 operates in the first operation mode, the first front-end circuit 24a is activated, and the RF module 24 is able to transmit and/or receive the RF signals in the first set of signal formats. Operations of the wireless device 20 operating in the first operation mode is the same as the wireless device 10, which is not narrated herein for brevity.

In some embodiments, the mixers 144a and 146 may be coupled to one or more synthesizers (not shown in FIG. 2) for receiving oscillator signals to down-convert RF signals to baseband signals or to up-convert baseband signals to RF signals. In some embodiments, the mixers 144a and 146 may be coupled to the synthesizer 148 to receive the oscillator signal(s) to down-convert the RF signals or to up-convert the baseband signals.

In some embodiments, the first operation mode can be used only for transmitting packets, e.g., EDR packets, including signals in the first set of signal formats but not in the second set of signal formats, e.g., DPSK modulated signals, and packets in the second set of signal formats, e.g., non-EDR packets, are transmitted in the second operation mode. By this way of per-packet mode switch, the power consumption could be further reduced.

Figure 3:
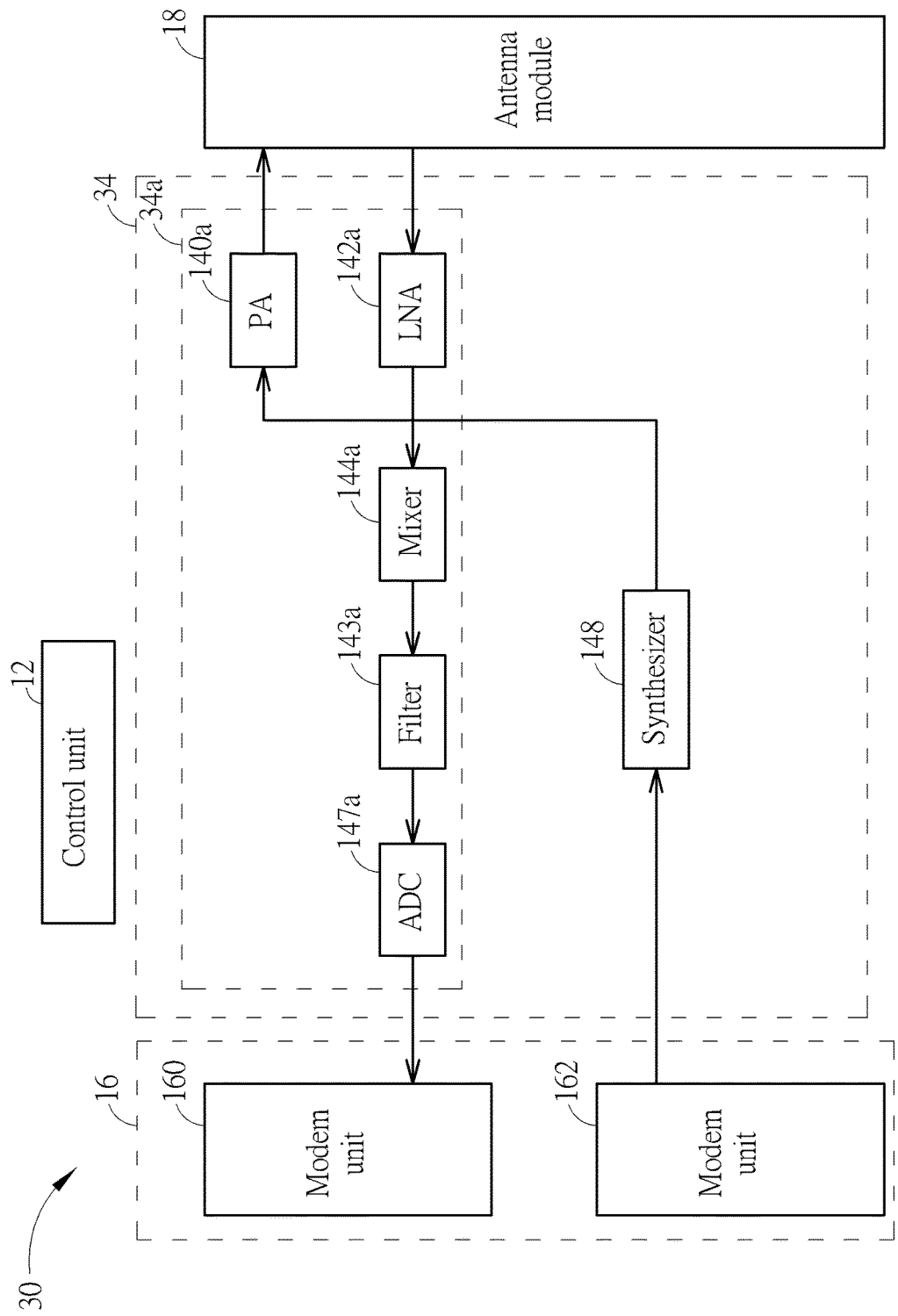
FIG. 3 is a schematic diagram of a wireless device according to an embodiment of the present disclosure.

FIG. 3 is a schematic diagram of a wireless device 30 according to an embodiment of the present disclosure. The wireless device 30 is configured to receive the low-rate and high-rate data signals and to transmit only the low-rate control signals. For example, the wireless device 30 may be a Bluetooth headset. The wireless device 30 is similar to the wireless device 20, and thus, the same components are denoted by the same notations. Compared to the wireless device 20, the wireless device 30 comprises an RF module 34, and the RF module 34 only comprises the synthesizer 148, the PA 140a, the LNA 142a, the mixer 144a, the filter 143a and the ADC 147a. Within the RF module 34, the synthesizer 148 is coupled to the PA 140a as well. To transmit the low-rate control signals (e.g., GFSK modulated signals), the synthesizer 148 and the PA 140a generate a transmitted RF signal in the second set of signal formats. To receive the low-rate and high-rate data signals, the LNA 142a, the mixer 144a, the filter 143a and the ADC 147a are activated to process the received RF signals in the first set of signal formats (e.g., the $\pi/4$ DQPSK, D8PSK modulated signals and GFSK signals), and generate the received digital data accordingly. In addition, the LNA 142a, the mixer 144a, the filter 143a and the ADC 147a may also be utilized to process the RF signals in the second set of signal formats, and generate the received digital data accordingly.

In some embodiments, the mixer 144a may be coupled to one or more synthesizers (not shown in FIG. 3) for receiving oscillator signals to down-convert RF signals to baseband signals. In some embodiments, the mixer 144a may be coupled to the synthesizer 148 to receive the oscillator signal(s) to down-convert the RF signals.

In some embodiments, the first set of signal formats and the second signal formats may be the same, in which the first set of signal formats is also the superset of the second set of signal formats. In one embodiment, the wireless device is similar to the wireless device 10 shown in FIG. 1, in which the difference is that the frond-end circuits 14a and 14b are both configured to transmit signals only in the second set of signal formats, and transmit power/performance of the frond-end circuit 14a is larger/better than the one of the frond-end circuit 14b. In another embodiment, the structure of the RF module in the wireless device comprises a first front-end circuit and a second front-end circuit both similar to the frond-end circuit 14a or 14b in FIG. 1. In one embodiment, the LNA in the first frond-end circuit has better linearity and noise figure compared to the LNA in the second front-end circuit. In one embodiment, the mixer in the first frond-end circuit has better linearity and noise figure compared to the mixer in the second frontend circuit. In one embodiment, the synthesizer coupled to the mixer in the first frond-end circuit has less phase noise compared to the synthesizer in the second front-end circuit. In one embodiment, the filter of the receiver in the first front-end circuit has less distortion and better interference rejection compared to the filter of the receiver in the second frond-end circuit. In the embodiments above, the control unit 12 determines which mode to operate in according to at least one of a power factor and a performance factor, in which the power factor may be the power consumed by the wireless device or the power consumed by the frond-end circuit, and the performance factor may be the received signal quality (e.g., SNR), circuit linearity, noise or interference tolerance.

In summary, the RF module and the wireless device of the present disclosure may operate in the first operation mode (in which the wireless device achieves higher data rate and/or better performance, e.g., signal quality, circuit linearity, noise sensitivity, interference tolerance, but consumes more power) or operate in a second operation mode (in which the wireless device keeps power consumption low but the data rate and/or performance thereof is sufficient), so as to maintain the required performance and to keep the power consumption as low as possible.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless device, operating within a wireless system, the wireless device comprising:
    a radio-frequency (RF) module and a modem module, configured to operate in a first operation mode or in a second operation mode; and
    a control unit, coupled to the RF module and the modem module, configured to generate a control signal to indicate the RF module and the modem module to operate in the first operation mode or to operate in the second operation mode;
    wherein a first set of signal formats corresponding to the first operation mode is a superset of a second set of signal formats corresponding to the second operation mode, and a first power consumption corresponding to the first operation mode is higher than a second power consumption corresponding to the second operation mode;
    wherein the RF module comprises:
        a first front-end circuit, configured to generate and process the RF signals in the first set of signal formats, comprising:
            a first mixer;
            a first power amplifier (PA), coupled to the first mixer;
            a first low noise amplifier (LNA); and
            a second mixer, coupled to the first LNA, wherein the first mixer and the first PA are configured to generate the RF signals in the first set of signal formats, and the first LNA and the second mixer are configured to receive and process the RF signals in the first set of signal formats; and
        a second front-end circuit, configured to generate and process the RF signals in the second set of signal formats.

2. The wireless device of claim 1, wherein the RF module generates or processes RF signals in the first set of signal formats if the RF module operates in the first operation mode, and the RF module generates or processes RF signals in the second set of signal formats if the RF module operates in the second operation mode.

3. The wireless device of claim 1, wherein the RF signals in the first set of signal formats correspond to Gaussian Frequency shift keying (GFSK) modulated baseband signals and differential phase shift keying (DPSK) modulated baseband signals, and the RF signals in the second set of signal formats correspond to Gaussian frequency shift keying (GFSK) modulated baseband signals.

4. The wireless of claim 1, wherein the first front-end circuit further comprises:
    a digital-to-analog convertor (DAC); and
    a filter, coupled between the DAC and the first mixer.

5. The wireless of claim 1, wherein the first front-end circuit further comprises:
    an analog-to-digital convertor (ADC); and
    a filter, coupled between the ADC and the second mixer.

6. The wireless device of claim 1, wherein the second front-end circuit comprises:
    a synthesizer;
    a second PA, coupled to the synthesizer;
    a second LNA; and
    a third mixer, coupled to the second LNA;
    wherein the synthesizer and the second PA are configured to generate the RF signals in the second set of signal formats, and the second LNA and the third mixer are configured to receive and process the RF signals in the second set of signal formats.

7. The wireless device of claim 1, wherein the second front-end circuit is further configured to process the RF signals in the first set of signal formats, and the second front-end circuit comprises:
    a synthesizer;
    a second PA, coupled to the synthesizer;
    a second LNA; and
    a third mixer, coupled to the second LNA;
    wherein the synthesizer and the second PA are configured to generate the RF signals in the second set of signal formats, and the second LNA and the third mixer are configured to receive and process the RF signals in the first set of signal formats.

8. The wireless device of claim 1, wherein the wireless system is a wireless personal area network (WPAN) system.

9. The wireless device of claim 1, wherein the wireless system complies with a Bluetooth standard, the first operation mode is an enhance data rate (EDR) operation mode under the Bluetooth standard.

10. The wireless device of claim 1, wherein the wireless system complies with a Bluetooth standard, and the second operation mode is a low energy (LE) mode under the Bluetooth standard.

11. A wireless device, operating within a wireless system, the wireless device comprising:
a radio-frequency (RF) module and a modem module, configured to operate in a first operation mode or in a second operation mode; and
a control unit, coupled to the RF module and the modem module, configured to generate a control signal to indicate the RF module and the modem module to operate in the first operation mode or to operate in the second operation mode;
wherein a first set of signal formats corresponding to the first operation mode is a superset of a second set of signal formats corresponding to the second operation mode, and a first power consumption corresponding to the first operation mode is higher than a second power consumption corresponding to the second operation mode;
wherein the RF module comprises:
a first mixer;
a power amplifier, coupled to the first mixer;
a second mixer;
a low noise amplifier, coupled to the second mixer; and
a synthesizer, coupled to the power amplifier;
wherein the first mixer and the power amplifier generate the RF signals in the first set of signal formats when the RF module operates in the first operation mode, and the synthesizer and the power amplifier generate the RF signals in the second set of signal formats when the RF module operates in the second operation mode.

12. The wireless device of claim 11, wherein the first mixer is disabled when the RF module operates in the second operation mode.

13. The wireless device of claim 11, the RF module further comprises:
a digital-to-analog convertor (DAC); and
a filter, coupled between the DAC and the first mixer;
wherein the DAC and the filter are disabled if the RF module operates in the second operation mode.

14. The wireless device of claim 11, wherein the RF signals in the first set of signal formats correspond to Gaussian Frequency shift keying (GFSK) modulated baseband signals and differential phase shift keying (DPSK) modulated baseband signals, and the RF signals in the second set of signal formats correspond to Gaussian frequency shift keying (GFSK) modulated baseband signals.

15. The wireless device of claim 11, wherein the wireless system is a wireless personal area network (WPAN) system.

16. The wireless device of claim 11, wherein the wireless system complies with a Bluetooth standard, the first operation mode is an enhance data rate (EDR) operation mode under the Bluetooth standard, and the second operation mode is a low energy (LE) mode under the Bluetooth standard.

17. A radio-frequency (RF) module, comprising:
a first mixer;
a power amplifier, coupled to the first mixer, wherein the first mixer and the power amplifier are configured to generate a first RF signal in a first set of signal formats;
a second mixer;
a low noise amplifier, coupled to the second mixer, wherein the second mixer and the low noise amplifier are configured to receive a received RF signal in the first set of signal formats; and
a synthesizer, coupled to the power amplifier, wherein the synthesizer and the power amplifier are configured to generate a second transmitted RF signal in a second set of signal formats;
wherein the first set of signal formats is a superset of the second set of signal formats.

18. The RF module of claim 17, wherein the first mixer is disabled if the synthesizer is activated.

19. The RF module of claim 17, further comprising:
digital-to-analog convertor (DAC); and
a filter, coupled between the DAC and the first mixer;
wherein the DAC and the filter are disabled if the synthesizer is activated.

20. The RF module of claim 17, wherein the RF signals in the first set of signal formats correspond to Gaussian Frequency shift keying (GFSK) modulated baseband signals and differential phase shift keying (DPSK) modulated baseband signals, and the RF signals in the second set of signal formats correspond to Gaussian frequency shift keying (GFSK) modulated baseband signals.

* * * * *